United States Patent

Jensen

[11] Patent Number: 6,074,447
[45] Date of Patent: *Jun. 13, 2000

[54] HYDROGEN STORAGE

[75] Inventor: Craig M. Jensen, Honolulu, Hi.

[73] Assignee: University of Hawaii, Honolulu, Hi.

[ * ] Notice: This patent is subject to a terminal disclaimer.

[21] Appl. No.: 08/917,906

[22] Filed: Aug. 27, 1997

Related U.S. Application Data

[63] Continuation-in-part of application No. 08/807,123, Feb. 21, 1997, abandoned.

[51] Int. Cl.[7] .................................. B01J 7/00; C10J 1/00
[52] U.S. Cl. ........................ 48/61; 48/127.9; 48/197 R; 585/14; 585/277; 585/661; 423/658.2
[58] Field of Search ...................... 48/61, 127.9, 197 R; 585/14, 275, 277, 661, 663; 423/658.2

[56] References Cited

U.S. PATENT DOCUMENTS

| | | | |
|---|---|---|---|
| 3,644,200 | 2/1972 | Young | 585/661 |
| 3,856,661 | 12/1974 | Sugier et al. | 208/138 |
| 3,954,601 | 5/1976 | Cosyns et al. | 208/143 |
| 4,346,752 | 8/1982 | Kesten et al. | 165/104.12 |
| 4,363,747 | 12/1982 | Hawthorne et al. | 252/431 |
| 4,447,665 | 5/1984 | Wennerberg | 585/379 |
| 4,522,932 | 6/1985 | Mitchell, III | 502/153 |
| 4,567,033 | 1/1986 | Kesten | 423/658.2 |
| 4,659,373 | 4/1987 | Bogdanovi | 75/0.5 |
| 4,725,615 | 2/1988 | Coates et al. | 514/397 |
| 4,731,203 | 3/1988 | Bogdanovic | 260/665 |
| 4,737,161 | 4/1988 | Szydlowski et al. | 48/61 |
| 4,962,265 | 10/1990 | De Clippeleir et al. | 585/660 |
| 4,982,015 | 1/1991 | Chao et al. | 568/802 |
| 4,992,600 | 2/1991 | Chao et al. | 568/802 |
| 4,999,428 | 3/1991 | Saksena et al. | 544/277 |
| 5,021,607 | 6/1991 | Huybrechts | 568/311 |
| 5,128,300 | 7/1992 | Chao et al. | 502/227 |
| 5,199,972 | 4/1993 | Bogdanovic | 75/255 |
| 5,672,801 | 9/1997 | Didillon | 585/663 |
| 5,739,076 | 4/1998 | Huybrechts et al. | 562/512.4 |
| 5,789,333 | 8/1998 | Angelici et al. | 502/113 |
| 5,811,608 | 9/1998 | Stine et al. | 585/316 |

*Primary Examiner*—Robert J. Warden, Sr.
*Assistant Examiner*—Fariborz Moazzam
*Attorney, Agent, or Firm*—Flehr Hohbach Test Albritton & Herbert, LLP

[57] ABSTRACT

A method for storing and releasing hydrogen fuel includes providing a hydrogenated material in a chamber, introducing a catalyst into the chamber, heating the chamber to about 190° C., separating at least part of the material into dehydrogenated material and hydrogen and releasing the hydrogen from the chamber. A preferred catalyst is a transition metal complex, such as the iridium based complex $IrH_4\{2,6C_6H_3(CH_2P(C(CH_3)_3)_2)_2\}$. To reverse the process, a hydrogen pressure of about 10 atmospheres or more is provided, and the dehydrogenated material and hydrogen are combined at about or at least 100° C. to regenerate the hydrogenated material. The small, lightweight system for carrying out the present method includes a chamber containing hydrogenated material and a catalyst, and having an outlet with a selectively permeable membrane for releasing hydrogen and containing hydrogenated material and a homogenous catalyst. A heat source for heating the material is positioned in, proximate to or remote from the chamber. A pressurizing hydrogen source delivers hydrogen gas to the chamber to regenerate the hydrogenated material. Vehicular apparatus or other devices requiring fuel sources may be retrofitted or equipped with the present system.

17 Claims, 2 Drawing Sheets

HYDROGEN STORAGE

This application is a continuation-in-part of application Ser. No. 08/807,123 filed Feb. 21, 1997 now abandoned.

BACKGROUND OF THE INVENTION

This invention relates to systems and methods for the chemical storage of hydrogen.

Hydrogen has been identified as a major energy resource for the future. The problems and expense associated with hydrogen storage, coupled with the low cost of gasoline, have prevented the use of hydrogen in today's energy market. The technical difficulties, expense and weight of containment vessels are the most significant problems hindering the commercial use of hydrogen energy. Political and environmental concerns, however, are currently stimulating the introduction of energy alternatives in the transportation market. Hydrogen can be a viable alternative if the storage problems are eliminated. Needs exist for a safe, compact relatively lightweight storage system for hydrogen.

One use where hydrogen as an energy source is approaching commercial feasibility is in the area of vehicular transportation. Although hydrogen presently costs about three times as much as gasoline, when environmental and political costs are added to the equation, hydrogen approaches commercial viability. Nationally, our leaders have revived interests in the production of methanol and hydrogen from natural resources. The state of California has enacted legislation which dictates that a set percent of each manufacturer's new car sales must meet Zero Emissions vehicle Standards, starting at two percent in 1998 and rising to ten percent by the year 2003. Other states are likely to enact similar legislation should California's experiment prove successful. Major car manufacturers, including Mercedes Benz, BMW and Mazda are pursuing hydrogen research as a means to comply with future environmental regulations. Needs exist for economically feasible methods and systems for producing and storing hydrogen that are useful in vehicular applications.

The current limiting parameter in creating an acceptable hydrogen-run vehicle is storage. Liquid hydrogen has proven unacceptable due to its cost of production and storage temperature requirements. Compressed gas, while cheaper, requires excessive storage space. Superactivated carbon systems are being developed, but research indicates that constant refrigeration below −120° C. is required. While some progress has been achieved by using metal hydrides to contain hydrogen in automobiles, the resulting storage tank is prohibitively heavy, thereby resulting in reduced driving ranges. Additionally, the hydrides must be heated to temperatures in excess of 300° C. before the bonded hydrogens are released, further limiting the effectiveness of that system. The solid hydrogen storage technique currently generating the most interest is a system that liberates hydrogen from the reaction between powdered iron and water. The oxidation process splits water into hydrogen and oxygen by converting iron to iron oxide. That reaction rate is increased using catalysts. That system has drawbacks, however, including the requirement that the system must be warmed up to several hundred degrees before the self-sustaining hydrogen-producing reaction occurs. That reaction is also irreversible and stoichiometric in iron. Needs exist for hydrogen production and storage systems that are lightweight, low cost and recyclable which do not have prohibitively high or low temperature requirements.

Hydrogen is used in a wide variety of industries including the chemical, electronics, metallurgical, food and aerospace industries. Needs exist in all those industries for hydrogen storage technology that is economically and operationally superior to existing storage methods.

SUMMARY OF THE INVENTION

The present invention is a system, and its accompanying method, for low temperature, reversible dehydrogenation of polycyclic hydrocarbons to aromatic compounds that uses transition metal polyhydride complexes as catalysts. The dehydrogenation proceeds smoothly at about 190° C. and is readily reversed by placing the system under 10 or more atmospheres of hydrogen pressure at about 100° C.

In a preferred embodiment of the present invention, the system includes a storage tank carrying a cycloalkane and 0.001 to 0.01 weight percent of catalyst. When the system is heated to approximately 190° C., the cycloalkane is dehydrogenated to aromatic hydrocarbon in the presence of the catalyst. FIG. 1 is the equation for that reaction using an iridium based catalyst.

In preferred embodiments, the catalyst is a metal complex, such as $IrH_4\{2,6C_6H_3(CH_2P(C(CH_3)_3)_2)_2\}$. Other catalysts are envisioned by and included under the scope of this invention.

The present invention is based on a common bulk organic chemical and a catalytic amount of a transition metal complex. The present system is far less expensive than current systems based on specialty alloys and cryogenic charcoal. It also represents a method of delivering hydrogen for vehicular use which can be distributed using standard gasoline infrastructure.

The present invention has numerous applications, including implementation as an on board hydrogen source for zero emissions vehicles. The present invention is both adequately lightweight to allow for an acceptable cruise range and capable of delivering hydrogen at an acceptable rate at low temperatures. The present system also has aerospace applications, as the density of hydrogen is greater in solid chemical form than in the cryogenic form currently used by the aerospace industry.

The present method uses metal complexes to catalyze the reversible dehydrogenation of polycyclic hydrocarbons to aromatic compounds at temperatures of approximately 260° C. The present system is based on a common bulk organic chemical and catalytic amount of the transition metal complex.

The present invention provides practical, hydrogen powered vehicles with an acceptable on board hydrogen source. One form of the invention is a hydrogen powered vehicle having a relatively small, lightweight storage tank. The storage tank contains a transition metal catalyst and, when empty contains an aromatic hydrocarbon, for example toluene ($C_7H_8$), when full contains a cycloalkane, for example methylcyclohexane ($C_7H_{14}$), and which usually contains mixtures thereof. A heat source heats the hydrogenated material to release hydrogen. The tank is filled by heating the dehydrogenated material and introducing hydrogen into the tank. The tank is emptied by heating the hydrogenated material and releasing hydrogen, preferably through a selective membrane. Heating the cycloalkane releases hydrogen.

The iridium complex catalyst $IrH_4\{2,6C_6H_3(CH_2P(C(CH_3)_3)_2)_2\}$ is preferred to reproducibly catalyze the dehydrogenation and hydrogenation.

These and further and other objects and features of the invention are apparent in the disclosure, which includes the above and ongoing written specification, with the drawing.

DETAILED DESCRIPTION OF THE PREFERRED EMBODIMENTS

Figure 1:
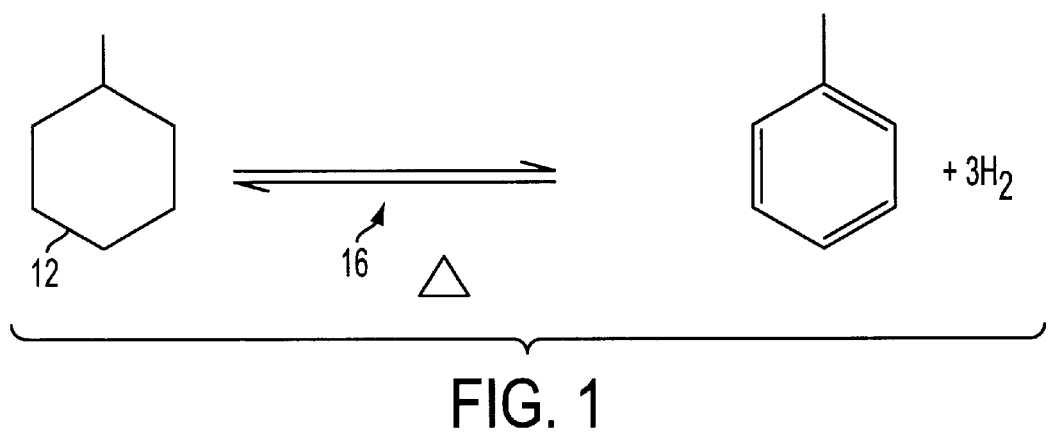
FIG. 1 is the equation for the dehydrogenation of methylcyclohexane to toluene in the presence of an iridium based catalyst.

As shown in FIG. 1, the present invention is a system and method for the low temperature, reversible dehydrogenation and hydrogenation of cycloalkanes and aromatic hydrocarbons. Hydrogen-containing starting material is dehydrogenated at a temperature of about 150° C. or more, preferably 190° C. or more, into aromatic hydrocarbons and hydrogen. That low temperature requirement is adequate due to the presence of a metal catalyst. The process is also reversible by establishing a pressure of about 10 or more, or 10 to 50 atmospheres of hydrogen in the chamber at a temperature of about 100° C. or more.

Figure 2:
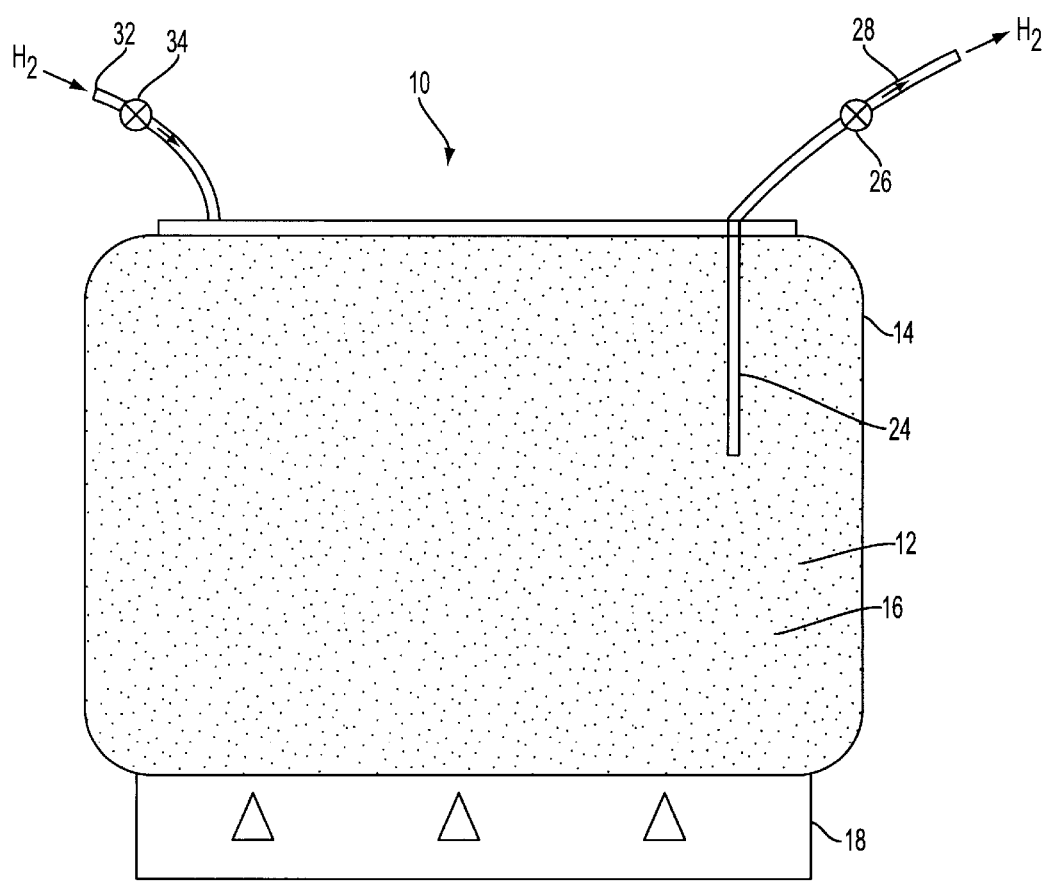
FIG. 2 schematically shows the present system.

The present invention provides for the safe, efficient storage, transport and release of hydrogen fuel. As shown in FIG. 2, the system 10 is small, lightweight and easy to incorporate as a fuel source for vehicles or other devices. A hydrogen-containing material 12, such as methylcyclohexane, is provided in a lightweight reaction chamber 14. A small amount of catalyst 16, which is preferably a transition metal complex, is placed in the chamber along with the hydrogen-containing material. Preferably, the chamber contains between about 0.01 and 0.001 weight percent of a homogenous catalyst. A source 18 of thermal energy, such as a heat source, is provided for heating the material to about 150° C. or more.

The system 10, which includes the reaction chamber 14, and the heat source 18, is lightweight and may be provided as a fuel source for a vehicle or other device. In its inactive, storage state, the heat source 18 is off. When hydrogen fuel is required, the chamber 14 or material is heated, and hydrogen is delivered through selectively permeable membrane 24, valve 26 and fuel line 28. The presence of the metal catalyst 16 substantially lowers the thermal energy requirement for driving the dehydrogenation reactions and hydrogenation. The heat source 18 need only increase the temperature of the material in the chamber 14 in the range of about 190° C. At that temperature, the cycloalkane material 12, in the presence of the metal catalyst 16, separates into aromatic hydrocarbons and hydrogen. The separated hydrogen flows out of the chamber 14 through a selective membrane, for example in tubular shape 24. The hydrogen is delivered to a location requiring a fuel input.

When fuel production is no longer required, the heat is discontinued. To fill the tank the process is reversed. The chamber 14, which includes the aromatic compounds and catalyst, is placed under about 10 atmospheres of hydrogen pressure through a hydrogen input 32 and a valve 34, which may be a check valve. The chamber 14 is heated to about 100° C. or more. The aromatic compounds combine with the hydrogen, in the presence of the catalyst 16, to form the hydrogen-containing starting material 12.

In its full state, the chamber 14 includes only starting material 12 and catalyst 16. When the system 10 is empty, the chamber 14 only includes dehydrogenated material and catalyst 16. For all states therebetween, the chamber 14 includes a mixture of starting material 12 and dehydrogenated material, along with catalyst 16.

The heat source 18 may be integral with, adjacent to or remote from the reaction chamber 14.

The catalyst 16 is preferably a transition metal complex, such as the iridium complex $IrH_4\{2,6C_6H_3(CH_2P(C(CH_3)_3)_2)_2\}$. In preferred embodiments, the starting product 12 is methylcyclohexane, with the aromatic hydrocarbon resulting from the dehydrogenation being toluene.

While the invention has been described with reference to specific embodiments, modifications and variations of the invention may be constructed without departing from the scope of the invention.

I claim:

1. A method for reversibly storing and releasing hydrogen fuel comprising the steps of:
   providing a reaction chamber with a selectively permeable membrane;
   providing a hydrogen containing material in the reaction chamber;
   introducing a homogenous catalyst into the chamber;
   wherein the catalyst is an iridium complex of the formula:

   $IrH_4\{2,6C_6H_3(CH_2P(C(CH_3)_3)_2)_2\}$;

heating at least a portion of the hydrogen containing material;
   separating the material into aromatic compounds and hydrogen; and
   releasing the hydrogen through the membrane from the chamber, said hydrogen being used as a fuel.

2. The method of claim 1, wherein the hydrogen containing material is a hydrocarbon.

3. The method of claim 2, wherein the hydrocarbon containing material is a cycloalkane.

4. The method of claim 1, wherein heating at least a portion of the hydrogen containing material further comprises raising temperatures in the material to at least about 190° C.

5. The method of claim 1, wherein heating the chamber for hydrogenation further comprises raising temperature in the material to at least about 150° C.

6. The method of claim 1 further comprising establishing a hydrogen pressure in the chamber of about 10 to 50 atmospheres and combining the aromatic compounds and the hydrogen to recreate the hydrogen containing product.

7. A system for receiving, storing and releasing hydrogen fuel, comprising:
   a chamber with a selective membrane, said chamber having an outlet for releasing hydrogen fuel and containing hydrogenated material and a homogenous catalyst wherein the homogenous catalyst is an iridium complex of the formula:

   $IrH_4\{2,6C_6H_3(CH_2P(C(CH_3)_3)_2)_2\}$;

a heat source for heating the hydrogenated material to produce the hydrogen fuel; and
   an inlet for delivering pressurized hydrogen gas to the chamber to rehydrogenate said hydrogenated material.

8. The system of claim 7, wherein the heat source is a heat source for raising a temperature of the material to at least about 190° C.

9. The system of claim 7, wherein heating the chamber for hydrogenation further comprises raising temperature in the material to at least about 150° C.

10. The system of claim 7, wherein the hydrogenated material is a cycloalkane.

11. The system of claim 7, wherein the hydrogenated material further comprises methylcyclohexane, decalin, dicyclohexyl, cyclohexane, or a combination thereof.

12. A vehicular apparatus comprising:

a body;

a motor connected to the body for moving the body;

a hydrogen fuel source;

a fuel line connected to the motor and to the hydrogen fuel source, wherein the fuel source further comprises a storage tank containing hydrogenated material and a homogenous catalyst, wherein said homogenous catalyst is an iridium catalyst of the formula:

$$IrH_4\{2,6C_6H_3(CH_2P(C(CH_3)_3)_2)_2\};$$

and a heat source thermally connected for increasing the temperature in the material to at least about 150° C., wherein said hydrogenated material is dehydrogenated to produce hydrogen fuel for powering said vehicular apparatus.

13. The apparatus of claim 12, wherein the hydrogenated material further comprises methylcyclohexane, decalin, dicyclohexyl, cyclohexane, or a combination thereof.

14. A method of powering a vehicle apparatus, comprising the steps of:

providing a tank having an inlet, said tank housing a hydrogen containing material and a homogenous catalyst wherein said homogenous catalyst is an iridium catalyst of the formula:

$$IrH_4\{2,6C_6H_3(CH_2P(C(CH_3)_3)_2)_2\};$$

dehydrogenating the hydrogen containing material by first heating at least a portion of the hydrogen containing material to produce hydrogen;

powering said vehicle apparatus with the hydrogen until the tank is emptied by dehydrogenating the hydrogen containing material; and filling the tank by second heating the tank and introducing hydrogen into the tank, to rehydrogenate the hydrogen containing material.

15. The method of claim 14 where in the dehydrogenating step, the first heating is carried out at a temperature of about 150° C. or greater.

16. The method of claim 14 where in the filling step, the second heating is carried out at a temperature of about 100° C. or greater, and the hydrogen is introduced into the tank to rehydrogenate the hydrogen containing material at a pressure in the range of about 10 to 50 atmospheres of hydrogen.

17. The method of claim 14 wherein the hydrogen containing material is a hydrocarbon.

* * * * *